July 30, 1957  A. J. WAIBEL  2,801,139
PISTON
Filed Feb. 7, 1955
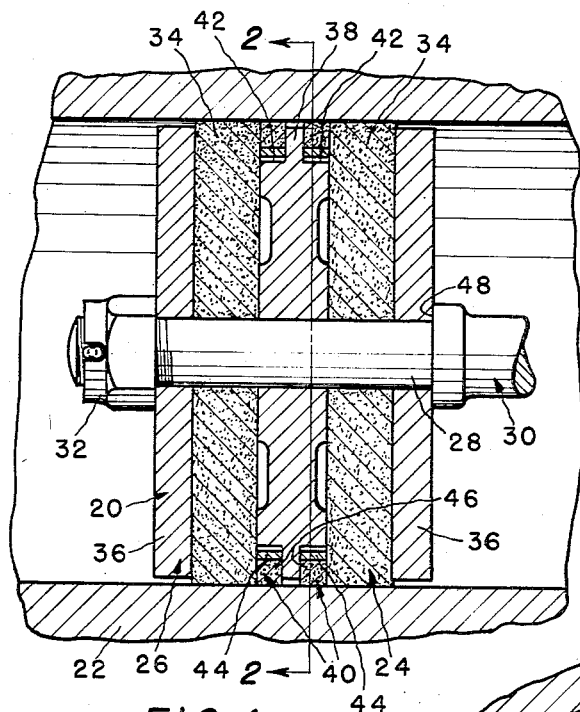
FIG.-1
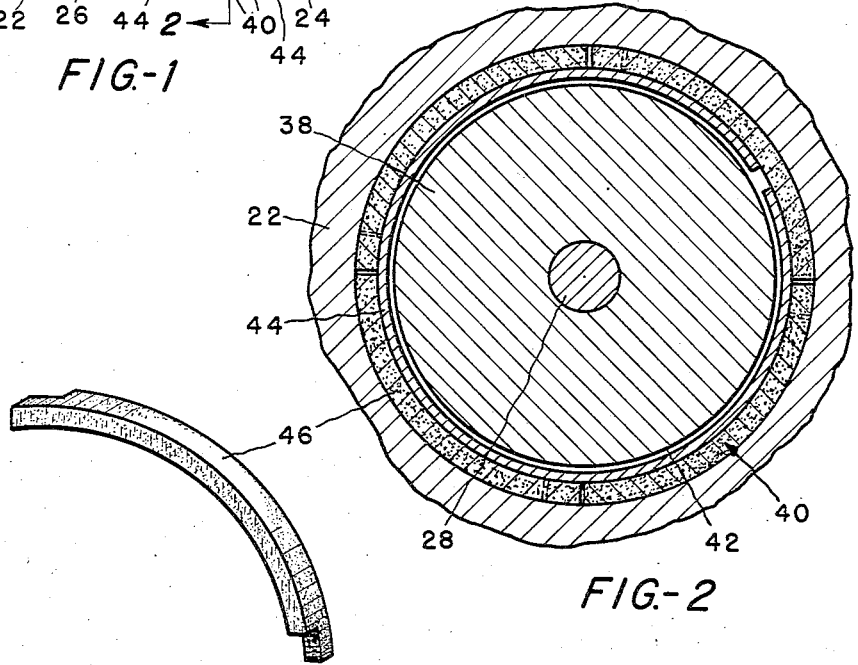
FIG.-2
FIG.-3
INVENTOR
ANTHONY J. WAIBEL
BY
HIS ATTORNEY

United States Patent Office 2,801,139
Patented July 30, 1957

2,801,139
PISTON

Anthony J. Waibel, Painted Post, N. Y., assignor to Ingersoll-Rand Company, New York, N. Y., a corporation of New Jersey Application February 7, 1955, Serial No. 486,376

7 Claims. (Cl. 309—9)

This invention relates to pistons, and more particularly to pistons used for pumping oil-free gases or liquids where no contamination from lubricating oil can be tolerated.

One object of the invention is to effect adequate lubrication between a piston and a cylinder without employing an oil lubricant.

Another object is to provide a non-lubricated piston construction comprising a plurality of sections of materials having different rates of thermal expansion which are so constructed and clamped together that the clamping pressure remains constant regardless of variations in temperature.

Another object is the provision of such a composite piston in which the relative rates of thermal expansion of the clamped sections and the clamping means are such that the expansion of the clamped sections equals or slightly exceeds the expansion of the clamping means in response to temperature changes such that the clamping pressure applied on the clamped sections at room temperature remains substantially the same at relatively high operating temperatures.

A further object is the provision of such a piston construction which is simple and inexpensive to manufacture and repair.

Other objects will become apparent from the following description and the accompanying drawings, which illustrate a preferred embodiment of the invention in which similar numerals refer to similar parts.

Fig. 1 is a sectional elevation of a piston and a portion of its cylinder constructed in accordance with the practice of the invention;

Fig. 2 is a transverse view taken along the line 2—2 of Fig. 1, looking in the direction indicated by the arrows, and Fig. 3 is a perspective view of one of the piston ring segments.

Referring to Fig. 1 of the drawings, the invention is shown as applied to a piston assembly 20 reciprocable in a cylinder 22. The piston assembly 20 comprises, in general, a plurality of sections including a wearing section 24 of a material having self lubricating qualities for supporting the piston substantially coaxial in the bore of the cylinder 22, and a body section 26 adjoining the wearing section 24 and forming therewith a unitary piston structure. The sections 24 and 26 are secured immovably together in end-to-end fashion on a portion 28 of a piston rod 30 by a nut 32 threaded thereon. The thermal expansion relation of the sections 24 and 26 to the rod portion 28 is such that the sections remain in fixed relation to each other irrespective of variations in temperature. In the piston disclosed by way of example, the wearing section 24, the rod portion 28 and the body section 26 are of materials having, respectively, low, medium and high rates of thermal expansion with respect to each other.

Referring in greater detail to the construction of the piston assembly 20, the wearing section 24 in the present embodiment comprises a pair of discs 34 of graphitic carbon having a relatively low coefficient of thermal expansion which are mounted coaxially on the piston rod portion 28 and slidably fit the bore of the cylinder 22. The self lubricating qualities of the graphitic carbon wearing discs 34 obviates the necessity of using oil lubricants in the cylinder bore and provides ample lubrication therebetween resulting in a minimum of cylinder wear.

The body section 26 locates the wearing discs 34 in spaced relation to each other on the rod portion 28 and together therewith constitutes the main structure of the piston assembly 20. For this purpose, the body section 26 consists of a pair of end discs 36 mounted coaxially on the rod portion 28 and adjoining the outer end faces of the wearing discs 34, and a spacer disc 38 positioned coaxially on the rod portion 28 between and seating against the inner end faces of the wearing discs 34. The end and spacer discs 36 and 38 are constructed of a material such as aluminum, with a relatively high coefficient of thermal expansion, and have a sufficiently smaller outside diameter than the wearing discs 34 to prevent rubbing contact of the end and spacer discs with the bore of the cylinder 22 during the life of the wearing discs.

The spacer disc 38 serves the added purpose of carrying a pair of piston rings 40, also of graphitic carbon and shown in Fig. 2. To accomplish this, the spacer disc 38 is provided with a pair of annular grooves 42, the outside bounding surfaces of which are formed by the inner end faces of the wearing discs 34, to slidably receive the piston rings 40 and a pair of expander rings 44 therefor.

As illustrated in Fig. 3 the piston rings 40 consist of a plurality of lap-jointed segments 46. Such a ring construction is required for small bore cylinders due to the small degree of elasticity inherent in graphitic carbon. However, in larger pistons incorporating the present piston construction the flexibility of the carbon is sufficient to permit the employment of conventional single split lap-jointed rings.

The wearing discs 34, end discs 36 and spacer disc 38 are secured rigidly together on the rod 30 to form the unitary piston assembly 20. To this end, the portion 28 of the rod 30 lying within the wearing and body sections 24 and 26 is of reduced diameter and forms at the juncture thereof and the rod proper a shoulder 48 which seats against one of the end discs 36. The free end of the rod portion 28 is threaded to receive the nut 32 which seats against the other end disc 36 for clamping the sections 24 and 26 immovably together on the rod portion 28.

When the piston assembly 20 is subjected to relatively high operating temperatures, the constituent sections 24 and 26 and the rod portion 28 expand according to their respective expansion rates. It is to be understood, however, that the expansion occurring in the sections 24 and 26 for any given temperature change depends upon their respective lengths as well as the thermal expansion rates of their respective materials. Therefore in the embodiment shown, the lengths and the expansion rates of the sections 24 and 26 and the rod portion 28 relative to each other are such that the expansion of the combined end and spacer discs, 36 and 38, and the wearing discs 34 is preferably substantially equal to or slightly greater than the expansion of the rod portion 28 lying within these discs. Since the nut 32 and the shoulder 48 on the rod 30 limit the actual expansion of the combined discs 34, 36 and 38 to that of the rod portion 28, any tendency of the discs to expand a greater amount than the rod portion creates an increase in clamping pressure between the discs.

Therefore, it will be seen that the employment of a relatively high thermal expansion rate material for the end and spacer discs, 36 and 38, at least offsets the relatively low thermal expansion rate of the carbon wearing discs 34 in the piston 20 such that the expansion of the piston is substantially equal to that of the rod portion 28. Thus the piston may be assembled at room temperature and the clamping pressure is maintained relatively constant throughout the normal operating temperature range of the piston.

Furthermore, in view of the fact that solid or composite graphitic carbon pistons mounted on steel rods are unsuitable for high temperature installations due to the unequal expansion rates of the two materials, the present piston assembly avoids this condition and provides a greater bearing or wearing area than a conventional non-lubricated piston of the same length employing carbon wearing rings for such service. In addition, the present construction is simple and inexpensive to manufacture and repair.

Although the construction described has proven highly successful in practice, it is to be understood that various combinations of piston sections may be used depending upon the expansive properties of the piston body materials employed without departing from the spirit of the invention or the scope of the appended claims.

I claim:

1. A piston comprising a plurality of sections, clamping means securing said sections immovably together, said sections being of material such that the piston expands in response to increases in temperature to at least the same extent as the expansion of the clamping means.

2. A piston assembly comprising sections of materials having different thermal expansion rates, and a clamping element securing said sections immovably together, the lengths of said sections being such that the assembled piston varies in length substantially the same amount as variations in length of the clamping element in response to variations in temperature.

3. A piston assembly comprising a plurality of sections, and a clamping element securing the sections immovably together, one of said sections being of a material having a low rate of thermal expansion relative to the clamping element, the other of said sections being of a material having a high rate of thermal expansion relative to the clamping element, the thermal expansion rates of the sections relative to each other being such that the assembled piston expands at least the same amount as the expansion of the clamping element in response to an increase in temperature.

4. A piston assembly comprising a plurality of sections, some of said sections being of a material having a relatively low thermal expansion rate as compared to the thermal expansion rate of other of said sections, and means securing said sections immovably together and being of a material such that the thermal expansion of said means in response to increases in temperature is not more than the thermal expansion of the piston.

5. A piston assembly comprising a wearing section of a material having a relatively low thermal expansion rate, a body section of a material having a relatively high thermal expansion rate, and means clamping the sections rigidly together at room temperature, the lengths of said sections and said expansion rates thereof relative to each other and said means being such that the thermal expansion of the combined sections is at least equal to that of said means in response to an increase in temperature.

6. A composite piston comprising wearing sections of a relatively low thermal expansion rate graphitic material, a spacer section of a relatively high thermal expansion rate metallic material disposed between the wearing sections, a rod extending through said sections, and means securing the wearing and spacer sections together immovably on the rod, the lengths of said sections and said expansion rates thereof relative to each other and to the rod being such that the overall thermal expansion of the sections is equal to that of the rod in response to an increase in temperature.

7. In a composite piston assembly, the combination of end discs of a relatively high thermal expansion rate metallic material, wearing discs of a relatively low thermal expansion rate graphitic material adjoining the end discs, a spacer disc of a relatively high thermal expansion rate metallic material seating against the wearing discs, a rod of a relatively medium thermal expansion rate metallic material extending through the discs, and means securing the discs together rigidly on the rod at room temperature, the lengths of said discs and said expansion rates thereof relative to each other and the rod being such that the thermal expansion of the combined discs is at least equal to that of the rod in response to an increase in temperature.

References Cited in the file of this patent

UNITED STATES PATENTS 2,092,087    Saharoff _____ Sept. 7, 1937